US010958717B2

(12) United States Patent
Caulfield et al.

(10) Patent No.: US 10,958,717 B2
(45) Date of Patent: *Mar. 23, 2021

(54) HARDWARE IMPLEMENTED LOAD BALANCING

(71) Applicant: Microsoft Technology Licensing, LLC, Redmond, WA (US)

(72) Inventors: Adrian Michael Caulfield, Woodinville, WA (US); Eric S. Chung, Woodinville, WA (US); Michael Konstantinos Papamichael, Redmond, WA (US); Douglas C. Burger, Bellevue, WA (US); Shlomi Alkalay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,832

(22) Filed: Aug. 30, 2019

(65) Prior Publication Data

US 2019/0394260 A1    Dec. 26, 2019

Related U.S. Application Data

(63) Continuation of application No. 15/408,365, filed on Jan. 17, 2017, now Pat. No. 10,425,472.

(51) Int. Cl.
*G06F 15/173* (2006.01)
*H04L 29/08* (2006.01)
(Continued)

(52) U.S. Cl.
CPC .......... *H04L 67/1002* (2013.01); *G06F 9/505* (2013.01); *G06F 9/5083* (2013.01);
(Continued)

(58) Field of Classification Search
CPC ..... H04L 67/1002; H04L 67/10; H04L 67/42; G06F 9/505; G06F 9/5083; G06F 15/161
See application file for complete search history.

(56) References Cited

U.S. PATENT DOCUMENTS

| 7,003,118 B1 * | 2/2006 | Yang ................... H04L 63/0485 |
| | | 370/393 |
| 8,812,727 B1 * | 8/2014 | Sorenson, III .......... H04L 47/70 |
| | | 709/238 |

(Continued)

FOREIGN PATENT DOCUMENTS

| CN | 102546383 A | 7/2012 |
| CN | 105162721 A | 12/2015 |

(Continued)

OTHER PUBLICATIONS

"First Office Action and Search Report Issued in Chinese Patent Application No. 201780081851.5", dated Oct. 27, 2020, 10 Pages.

*Primary Examiner* — Cheikh T Ndiaye
(74) *Attorney, Agent, or Firm* — Alleman Hall Creasman & Tuttle LLP

(57) ABSTRACT

A server system is provided that includes a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services, wherein each hardware acceleration device maintains in memory a data structure that contains load data indicating a load of each of a plurality of target hardware acceleration devices, and wherein a requesting hardware acceleration device routes the request to a target hardware (Continued)

acceleration device that is indicated by the load data in the data structure to have a lower load than other of the target hardware acceleration devices.

20 Claims, 9 Drawing Sheets

(51) Int. Cl.
*H04L 29/06* (2006.01)
*G06F 9/50* (2006.01)
*G06F 15/16* (2006.01)

(52) U.S. Cl.
CPC ............ *G06F 15/161* (2013.01); *H04L 67/10* (2013.01); *H04L 67/42* (2013.01)

(56) References Cited

U.S. PATENT DOCUMENTS

| | | | | |
|---|---|---|---|---|
| 8,910,153 | B2* | 12/2014 | Gupta | G06F 9/5077 718/1 |
| 9,667,711 | B2* | 5/2017 | Guerin | H04L 67/1008 |
| 2016/0306667 | A1* | 10/2016 | Burger | G06F 9/5027 |
| 2016/0380885 | A1* | 12/2016 | Jani | H04L 47/781 370/408 |
| 2017/0286157 | A1* | 10/2017 | Hasting | G06F 9/5038 |

FOREIGN PATENT DOCUMENTS

| | | |
|---|---|---|
| CN | 106155959 A | 11/2016 |
| CN | 106230952 A | 12/2016 |
| CN | 107533496 A | 1/2018 |

* cited by examiner

US 10,958,717 B2

HARDWARE IMPLEMENTED LOAD BALANCING

CROSS REFERENCE TO RELATED APPLICATIONS

This application is a continuation of U.S. patent application Ser. No. 15/408,365, filed Jan. 17, 2017, the entirety of which is hereby incorporated herein by reference for all purposes.

BACKGROUND

Server systems use load balancing processes to direct requests to less-loaded servers in the server system to improve efficiency in handling a large amount of requests. Many current load balancing solutions are software-driven, and perform load balancing processes with relatively stale load data. Thus, when a request is routed to a server according to these load balancing processes, by the time the request reaches that server, the load on that server may have already increased beyond what was calculated by the software driven load balancer based on stale load data, causing that server to be unable to timely service that request.

SUMMARY

To address the above issues, a server system for hardware implemented load balancing is provided. The server system may include a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services, wherein each hardware acceleration device maintains in memory a data structure that contains load data indicating a load of each of a plurality of target hardware acceleration devices implementing a designated hardware accelerated service of the plurality of hardware accelerated services, and wherein, when a requesting hardware acceleration device routes a request for the designated hardware accelerated service, the requesting hardware acceleration device routes the request to a target hardware acceleration device that is indicated by the load data in the data structure to have a lower load than other of the target hardware acceleration devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
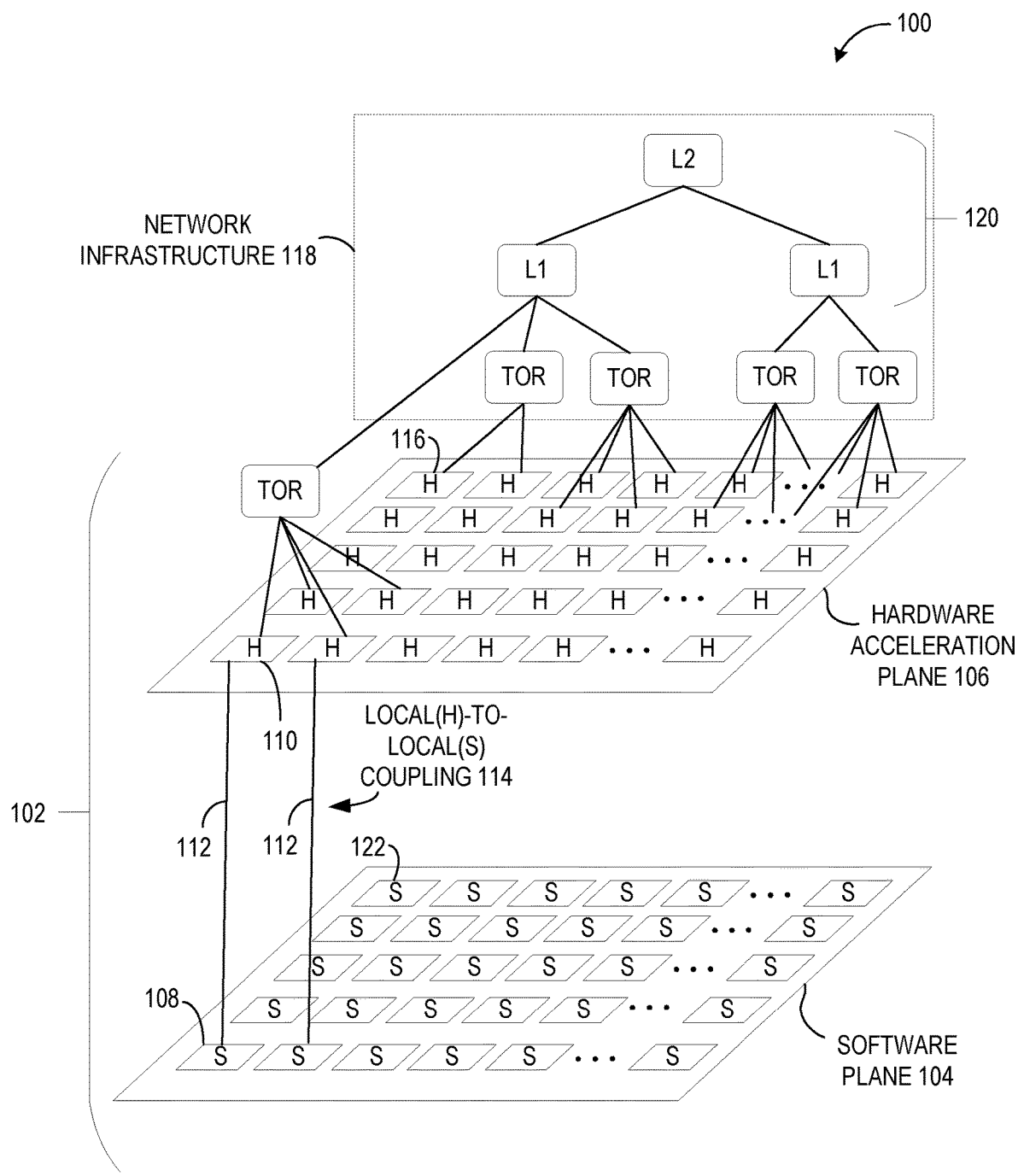
FIG. 1 is a schematic view that shows an example server system of the present description.

FIG. 1 illustrates a server system 100 that includes a plurality of servers 102 that collectively provide a software plane 104 and a hardware acceleration plane 106. The software plane 104 includes a collection of software-driven components (each denoted by the symbol "S" in FIG. 1), and the hardware acceleration plane 106 includes a collection of hardware accelerated components (each denoted by the symbol "H" in FIG. 1). In one example, each host component may correspond to a host server instance executed by one or more processor of one of the plurality of servers 102. In this example, each hardware acceleration component may correspond to a hardware acceleration device including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

The term "hardware" acceleration component may also encompass other ways of leveraging a hardware acceleration device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. It will be appreciated that the hardware acceleration plane 106 may represent a homogeneous collection of hardware acceleration devices, such as, for example, FPGA devices. On the other hand, the hardware acceleration plane 106 may represent a heterogeneous collection of different types of hardware acceleration devices including different types of FPGA devices having different respective processing capabilities and architectures, a mixture of FPGA devices and other types hardware acceleration devices, etc.

A processor generally performs operations using a temporal execution paradigm, e.g., by using each of its processor hardware threads to execute machine-readable instructions sequentially. In contrast, a hardware acceleration device may perform operations using a spatial paradigm, e.g., by using a large number of parallel logic elements to perform computational tasks. Thus, hardware acceleration component can perform some operations that may be broken down into many parallel tasks in less computing time compared to processors and software-driven components. Thus, the "acceleration" qualifier associated with the term "hardware acceleration device" used herein may reflect its potential for accelerating the functions that are performed by the processors of the servers.

Figure 2:
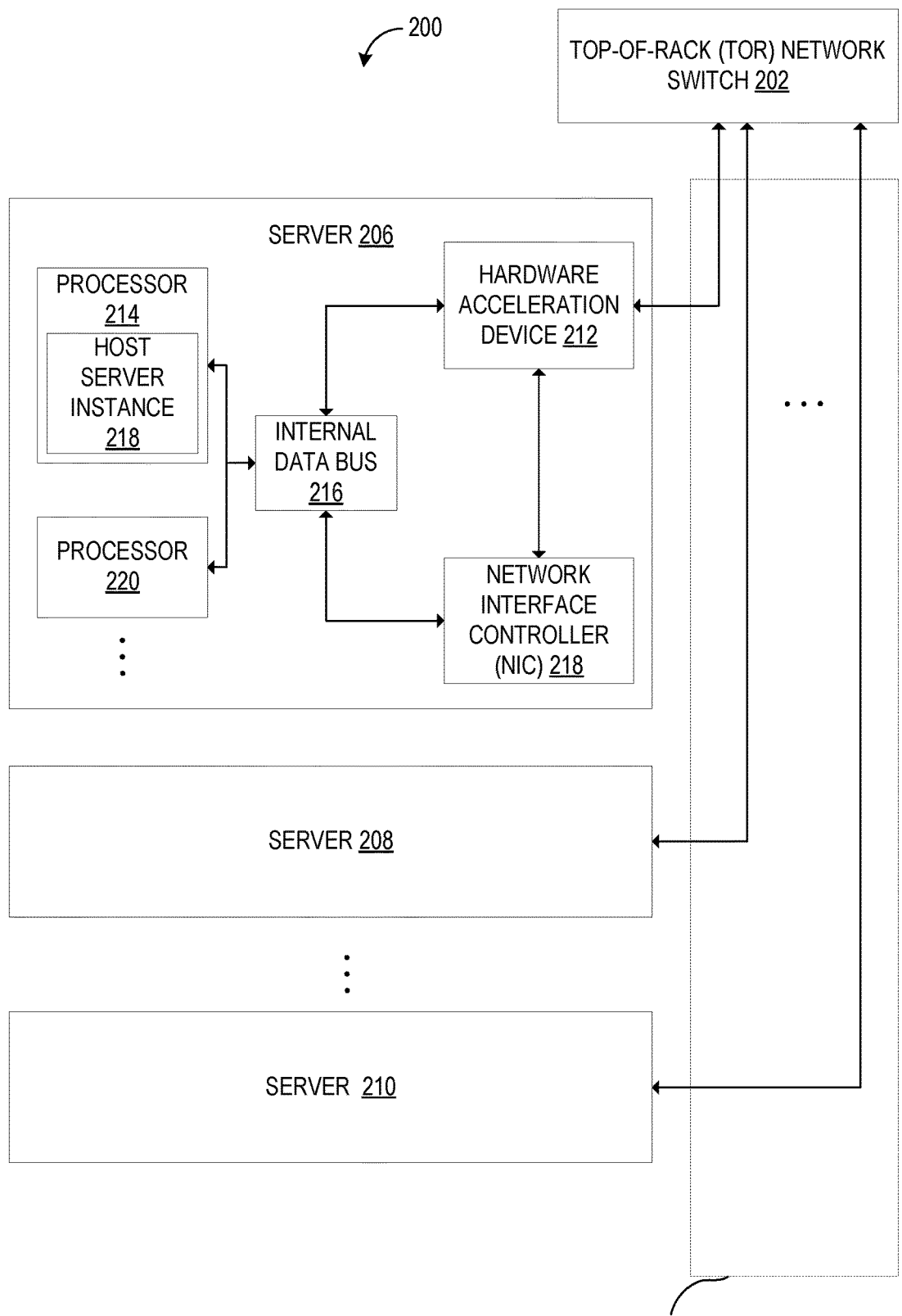
FIG. 2 is a schematic view that shows a server cluster of the example server system of FIG. 1.

In one example, the server system 100 corresponds to a data center environment that communicatively couples the plurality of servers 102 via standard network infrastructure. Turning to FIG. 2, the plurality of servers 102 are organized into a plurality of server clusters 200, each server cluster including a top of rack (TOR) network switch 202, two or more servers of the plurality of servers 102, such as servers 206, 208, ..., and 210, and a backplane 204 communicatively coupling the top of rack network switch 202 and the two or more servers. For example, each server cluster 200 may correspond to a server rack that provides physical structure, ventilation, etc., for a TOR switch 202 and a plurality of servers 206, 208, ..., and 210 that are located physically proximate to each other in the same server rack. The backplane 204 communicatively coupling each server in the server rack may facilitate a low latency and high bandwidth exchange of network packets between servers in the same server rack.

As illustrated in FIG. 2, each server 206, 208, ..., 210, in the server cluster 200 includes at least one hardware acceleration device 212 and at least one processor 214 communicatively coupled to the hardware acceleration device 212 by an internal data bus 216 and executing a host server instance 218. As shown, each server may include more than one processor, such as additional processor 220, and so on. The more than one processors may each execute separate host server instances 218, or may collectively execute a single host server instance. In one example, the internal data bus 216 may take the form of a Peripheral Component Interconnect Express (PCIe) link, for example. Data buses of other formats may alternatively be used. It will be appreciated that "internal" as used in the term "internal data bus" refers to the fact that at least a portion of the data bus is typically housed in the same housing (which serves as a Faraday cage) as the processor of the server, and should be understood to encompass a data bus that connects a processor of the server in a housing with an internally mounted hardware acceleration component plugged into a PCIe slot on a circuit board of the server as one example, or to an externally coupled hardware acceleration component plugged into, e.g., a PCIe port on an external surface of the housing of the server. As illustrated, the hardware acceleration device 212 is also indirectly coupled to the processor 214 via a network interface controller (NIC) 218 that is also coupled to the processor 214 by an internal data bus 216, which, for example, may comprise one or more internal data buses as subcomponents.

Finally, as illustrated in FIG. 2, the hardware acceleration device 212 of each server 208 in the server cluster 200 is coupled to the TOR network switch 202. Thus, in the illustrated example, the hardware acceleration device 212 provides the sole path through which the processor 214 interacts with other servers 208, ..., 210, in the server cluster 200, as well as with other servers in the plurality of servers 102 of the server system 100. Among other effects, the architecture of FIG. 2 allows the hardware acceleration device 212 coupled to the processor 214 to perform processing on packets that are received from and/or sent to the TOR network switch 202 (e.g. by performing encryption, compression, etc.), without adding computational burden on the one or more processors 214, 220, and so on.

In this example, each host server instance 218 is coupled to at least one hardware acceleration device 212 through an internal data bus 216, such that these components are physically coupled together as a server. The hardware acceleration device and the host server component executed by the processor in the same server may be referred to herein as the "local" hardware acceleration device and the "local" host server instance to distinguish it from other hardware acceleration devices and host server instances corresponding to other servers. On the other hand, the hardware acceleration devices and host server instances of other servers may be referred to herein as "remote" hardware acceleration devices and "remote" host server instances to distinguish them from a particular server's local hardware acceleration device and local host server instance. The use of "remote" in this context does not necessitate that the remote devices be positioned across a wide area network (WAN) from the requesting device, as typically they are provisioned within the same data center. Additionally, servers within the same server cluster may be referred to as "peer" servers to distinguish them from other servers in the server system 100 that are not in that particular server cluster.

Turning back to FIG. 1, the host server instances executed by the processors of the plurality of servers 102 collectively provide the software plane 104, and the hardware acceleration devices of the plurality of servers 102 collectively provide the hardware acceleration plane 106. FIG. 1 shows an example local host server instance 108 of the software plane 104, the example local host server instance 108 executed by a processor that is coupled to a local hardware acceleration component 110 of the hardware acceleration plane 106 through an internal data bus 112. That pairing forms a single server of the plurality of servers 102. More generally, FIG. 1 shows that the software plane 104 is coupled to the hardware acceleration plane 106 through a plurality of individual internal data buses, which FIG. 1 collectively refers to as local(H)-to-local(S) coupling 114.

The local host server instance 108 may further indirectly communicate with other remote hardware acceleration devices in the hardware acceleration plane 106. For example, the local host server instance 108 has access to a remote hardware acceleration device 116 via the local hardware acceleration device 110, which may communicate with the remote hardware acceleration device 116 via network infrastructure 118. In one example, the network infrastructure 118 includes common network infrastructure to couple the servers within a server cluster together within a server rack via a TOR network switch. As illustrated in FIG. 1, the server system 100 includes a plurality of server clusters that each have an associated TOR network switch, and may have the architecture described in FIG. 2. Network infrastructure 118 may further include higher-level switching infrastructure 120 (L1) and (L2) that connects the TOR network switches together. The higher-level switching infrastructure 120 may take the form of any suitable networking architecture, and may be driven by any suitable routing protocol(s). In the illustrated example, the higher-level infrastructure 120 includes a collection of aggregation switches L1 and core switches L2. However, it will be appreciated that the higher-level switching infrastructure may include any suitable number of levels of switches.

Thus, as illustrated in FIG. 1, each host server instance of the software plane 104 may communicate with other host server instances through the respective hardware acceleration devices and the network infrastructure 118. Thus, it will be appreciated that the same network infrastructure 118 used to communicatively couple each host server instance to other host server instances in the software layer 104, also communicatively couples each hardware acceleration device to other hardware acceleration devices in the hardware acceleration layer 106. In the example of server system 100, interaction among host server instances in the software plane 104 is independent of interaction among hardware acceleration devices in the hardware acceleration plane 106. In particular, for example, two or more hardware acceleration devices may send and consume network packets between each other outside of any direction or intervention from the host server instances of the software plane 104, and without the host server instances being "aware" or otherwise computationally burdened by any particular interactions that are taking place in the hardware acceleration plane 106. On the other hand, a host server instance may initiate interactions that take place in the hardware acceleration plane 106 by issuing a request that may be read and routed by the local hardware acceleration device for that particular host server instance.

In one example, the server system 100 uses the Ethernet protocol to transmit IP packets over the network infrastructure 118. In this example, each host server instance of the plurality of servers 102 in the server system 100 may be associated with a single physical IP address for the particular server containing the processor executing that host server instance. The local hardware acceleration device in the same server may adopt the same IP address. The server can determine whether an incoming packet is destined for the local host server instance as opposed to the local hardware acceleration component through several methods. For example, packets that are destined for the local hardware acceleration device can be formulated as user datagram protocol (UDP) packets specifying a specific port assigned to the local hardware acceleration device. On the host hand, packets that are destined for the local host server instance are not formulated as UDP packets. In another example, packets belonging to the hardware acceleration plane 106 may be distinguished from packets belonging to the software plane 104 based on the value of a status flag in each of the packets.

The hardware acceleration plane 106 implements a plurality of hardware accelerated services. For example, the plurality of hardware accelerated services may include, for example, encryption services, expensive compression services, deep neural network services, bioinformatics services, web search ranking services, decision tree computation services, etc. It will be appreciated that the hardware accelerated services mentioned above are merely exemplary, and any other hardware accelerated services not specifically mentioned above may also be included in the plurality of hardware accelerated services.

Figure 3:
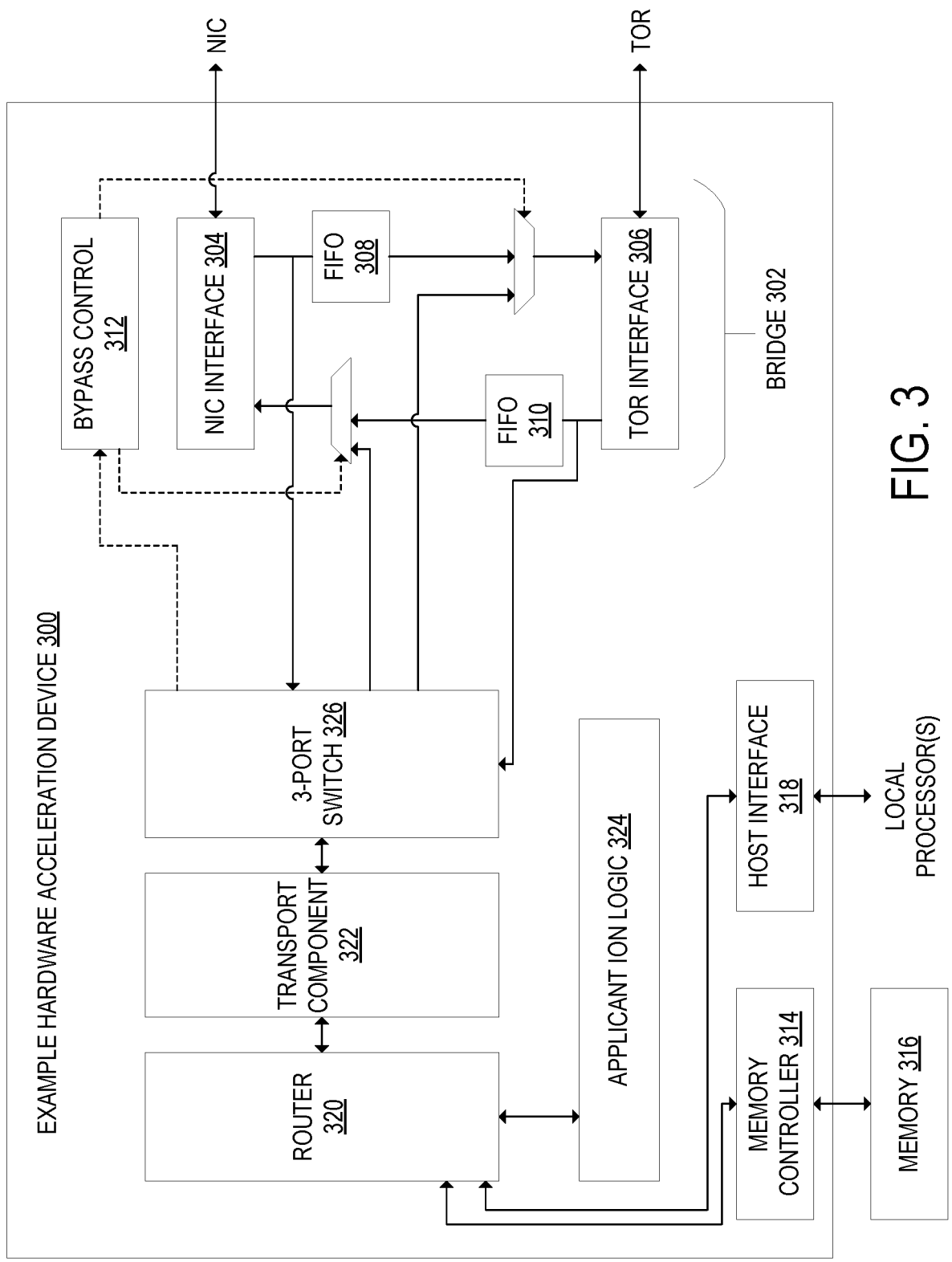
FIG. 3 is a schematic view of an example hardware acceleration device of the example server system of FIG. 1.

FIG. 3 illustrates an example hardware acceleration device 300 of the hardware acceleration layer 106, which, for example, may be implemented as an FPGA device. It will be appreciated that the form of the hardware acceleration devices are not limited to the illustrated example, and other hardware acceleration device architectures may be used.

As illustrated, the example hardware acceleration device 300 includes a bridge 302 for coupling the hardware acceleration device 300 to the network interface controller via a NIC interface 304 and a local top-of-rack switch via a TOR interface 306. In one example, the bridge 302 supports two modes. In a first mode, the bridge 302 provides a data path that allows traffic from the NIC or TOR to flow into the hardware acceleration device 300, and traffic from the hardware acceleration device 300 to flow out to the NIC and TOR. The hardware acceleration device 300 can perform processes on the traffic that flows through the bridge 302, including a hardware accelerated service of the plurality of hardware accelerated services, such as, for example, compression, encryption, web search ranking, etc. In a second mode, the bridge 302 supports a data path that allows traffic to flow between the NIC and the TOR without being further processed by the hardware acceleration device 300. Internally, the bridge may be composed of various first in first out buffers (FIFOs) (308, 310) which buffer received packets, and various selectors and arbitration logic which route packets to their desired destination. A bypass control 312 controls whether the bridge 302 operates in the first mode or the second mode.

As further illustrated in FIG. 3, a memory controller 314 governs interaction between the hardware acceleration device 300 and local memory 316, such as DRAM memory of the server containing the hardware acceleration device 300. For example, the hardware acceleration device 300 may update a memory page of the local memory 316 which may be accessible by the local host server instances executed by the local processor of that server.

A host interface 318 provides functionality that enables the hardware acceleration device 300 to interact with a local processor executing a local host server instance. In one example, the host interface 318 may interact with the local host server instance via the internal data bus, such as a PCIe link. Alternatively, the hardware acceleration device 300 may interact with the local host server instance with low latency by updating a memory page of the local memory 316 that is accessible by the local host server instance.

In one example, the hardware acceleration device 300 may include a router 320 for routing messages between various internal components of the hardware acceleration device 300 and between the hardware acceleration device 300 and external components via a transport components 322. Each such end-point is associated with a respective port. In the illustrated example, the router 320 is coupled to the memory controller 314, the host interface 318, the transport component 322, and application logic 324.

In an FPGA implementation of the hardware acceleration device 300, the application logic 324 may include programmable logic for implementing a particular hardware accelerated service of the plurality of hardware accelerated services. In the FPGA implementation, the application logic 324 may be reprogrammable to change the hardware acceleration device 300 from implementing a first hardware accelerated service to a second hardware accelerated service.

The transport component 322 formulates packets for transmission to remote entities, such as remote hardware acceleration devices, and receives packets from remote acceleration devices in the hardware acceleration plane 106.

In the illustrated example, the transport component 322 is coupled to a 3-port switch 326 that when activated, may take over function of the bridge 302 by routing packets between the NIC and TOR, and between the NIC or TOR and a local port associated with the hardware acceleration device itself. The 3-port switch 326 may operate to safely insert and remove hardware acceleration device generated network packets on the server system 100 network without compromising local host server instance to TOR network traffic traveling via the bridge 302.

Figure 4:
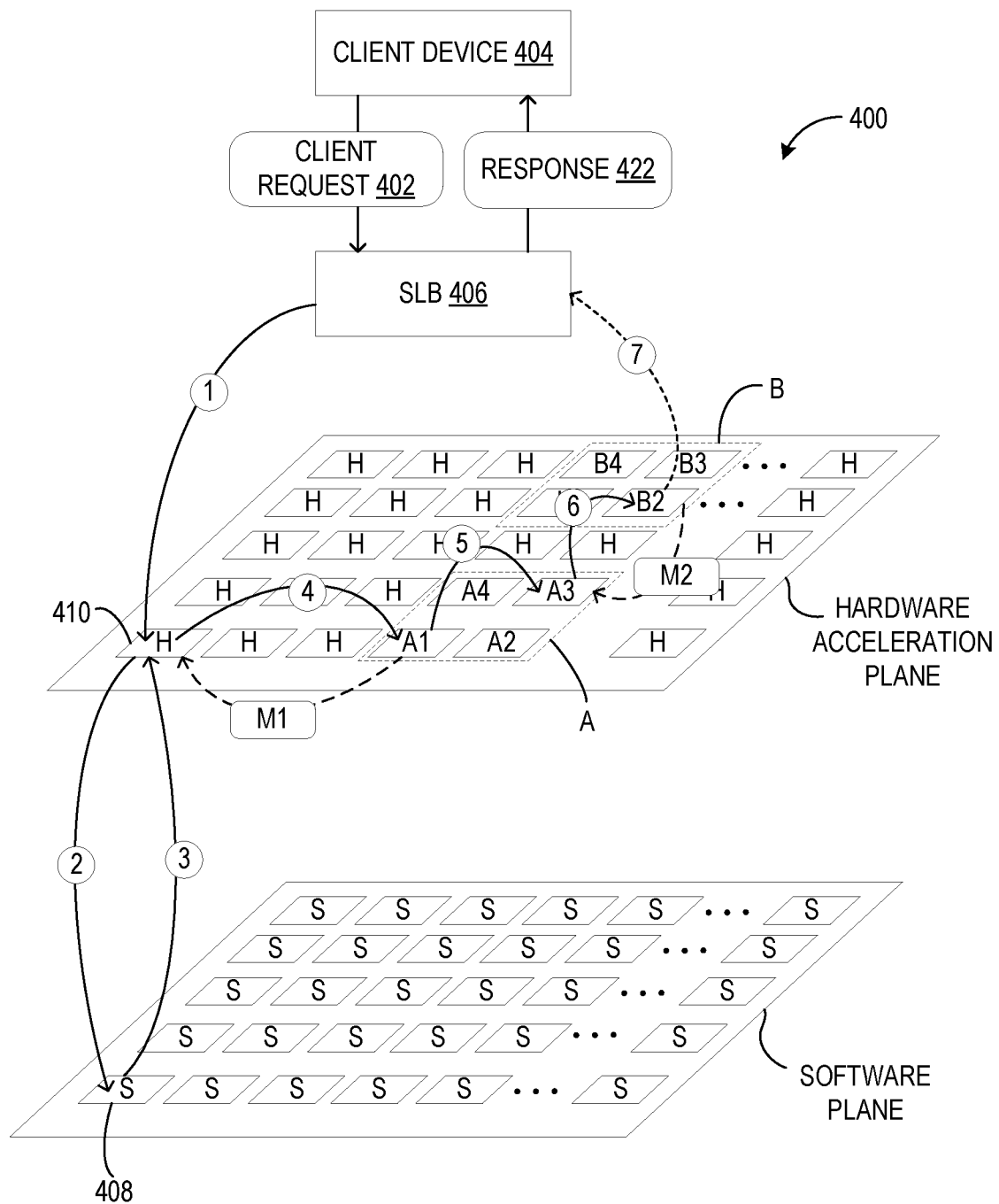
FIG. 4 is a schematic view that shows an example request for a hardware accelerated service for the example server system of FIG. 1.

FIG. 4 illustrates an example scenario for an example server system 400 that receives a client request 402 from a client device 404 of an end-user of the services provided by the example server system 400. The client request 402 is received by a server load balancer (SLB) 406 of the example server system 400. In this example, the SLB may, for example, be a software-driven load balancer that routes the client request 402 to a host server instance of the software plane that is able to service the client request 402. In the illustrated example, the SLB 406 routes the client request 402 to the IP address of the example host server instance 408. At step (1), the client request 402 is received by the example local hardware acceleration device 410 that is coupled to the processor executing the local example host server instance 408 via an internal data bus. The example local hardware acceleration device 410 reads the client request 402, and determines that the client request 402 is destined from the example local host server instance 408. Thus, at step (2), the example local hardware acceleration device 410 passes the client request 402 to the example local host server instance 408 via an internal data bus, such as, for example, a PCIe link. The example local host server instance 408 receives the client request 402, and processes the client request 402 according to server application logic of the example local host server instance 408.

In the illustrated example, the example local host server instance 408 designates two hardware accelerated services of the plurality of hardware accelerated services implemented by the hardware acceleration plane that are required to fully service the client request 402. It will be appreciated that while in this specific example the example local host server instance 408 determines which hardware accelerated services are required, in other examples different entities such as the local hardware acceleration device 410 or the SLB 406 may determine which hardware accelerated services are required to fully service the client request 402.

Accordingly, at step (3), the example local server instance 408 sends a request for one or more designated hardware accelerated services. As illustrated, the example local hardware acceleration device 410 reads the request, and routes the request to a suitable remote hardware acceleration device if the example local hardware acceleration device 410 does not implement the one or more designated hardware accelerated services. In this specific example, the request for the designated hardware accelerated service is a multi-part request, that includes a sequential request for a first designated hardware accelerated service of type A implemented by a first server cluster A, and then a second designated hardware accelerated service B implemented by a second server cluster B. In one example, each designated hardware accelerated service in the multi-part request is implemented sequentially. In another example, each designated hardware accelerated service in the multi-part request is implemented concurrently by several remote hardware acceleration devices each implementing one of the designated hardware accelerated services in the multi-part request. In another example, the multi-path request includes both sequential and parallel steps for a plurality of designated hardware accelerated services.

Figure 5:
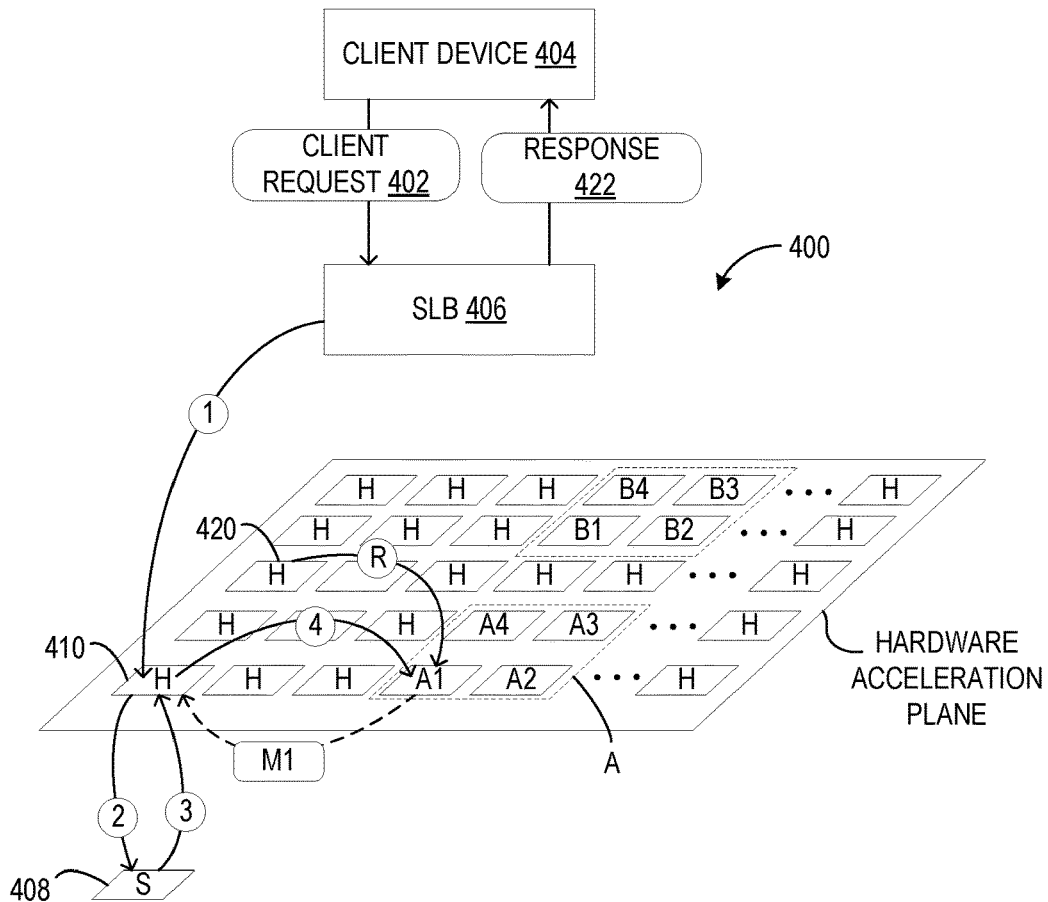
FIG. 5 continues the example request for a hardware accelerated service of FIG. 4.

Turning briefly to FIG. 5, when the example local hardware acceleration device 410 reads the request originating from the example local host server instances 408, the example local hardware acceleration device 410 determines that the request is for one or more designated hardware accelerated services. In particular, the example local hardware acceleration device 410 determines that the request needs to be serviced by a remote hardware acceleration device implementing a first designated hardware accelerated service of type A. In order to route the request to a suitable remote hardware acceleration device that implements the first designated hardware accelerated service of type A, the example local hard acceleration device 410 accesses a data structure that contains load data from local memory of the server containing the example local hardware acceleration device.

In one example, each hardware acceleration device maintains in memory a data structure 412 that contains load data 414 indicating a load of each of a plurality of target hardware acceleration devices 416 implementing a designated hardware accelerated service 418 of the plurality of hardware accelerated services. That is, each hardware acceleration device maintains its own data structure for load data 414 for each target hardware acceleration device implementing each hardware accelerated service implemented in the hardware acceleration plane. In one example, the data structures maintained by each hardware acceleration device include load data 414 for every target hardware acceleration device implementing a particular hardware accelerated service for every hardware accelerated service in the hardware acceleration plane.

In another example, the data structures maintained by each hardware acceleration device include load data 414 for the target hardware acceleration devices implementing each of a subset of the plurality of hardware accelerated services. In particular, each hardware acceleration device may maintain a data structure that contains data for the target hardware acceleration devices that implement a particular hardware accelerated service that is frequently requested for that hardware acceleration device. It will be appreciated that these example subsets are exemplary, and other combinations of load data 414 may be stored in the data structures.

In the example illustrated in FIG. 5, the load data for each target hardware acceleration device 416 includes a discrete value between 0 and 255. It will be appreciated that any range of values may be utilized to represent the load data. Additionally, in other examples, the load data is not stored as a single discrete value. For example, the load data 414 may include a plurality of data types and values. Such as, for example, a number of queued requests for the target hardware acceleration device, a recent processing time of a previous request, an estimate based on the number and type of requests in the queue, a total size of the queued requests, a round trip time for receiving responses to requests, and any other suitable types of data that may indicate a load of the target hardware acceleration device.

In one example, when a requesting hardware acceleration device routes a request for the designated hardware accelerated service, the requesting hardware acceleration device routes the request to a target hardware acceleration device that is indicated by the load data in the data structure to have a lower load than other of the target hardware acceleration devices. In the example illustrated in FIG. 5, at step (4), the example local hardware acceleration device 410 is the requesting hardware acceleration device that is determining where to route the request received from the example local host server instance at step (3). Thus, the requesting hardware acceleration device (410 in this example), reads the request, determines that the request needs to be serviced by a remote hardware acceleration device implementing the designated hardware accelerated service of type A, and determines which of a plurality of target hardware acceleration devices 416 is indicated by the load data in the data structure to have a lower load than other of the target hardware acceleration devices. That is, in the illustrated example, the requesting hardware acceleration device determines that there are four possible target hardware acceleration devices that implement the designated hardware accelerated service of type A. As shown, there is a server cluster A that includes the four target hardware acceleration devices that implement the same designated hardware accelerate service of type A. Next, the requesting hardware acceleration device (410 in this example), determines that the target hardware acceleration device A1 in the server cluster A, currently has load data in the data structure that is lower than load data for other target hardware acceleration devices in the server cluster A. It will be appreciated that in some examples, not all of the hardware acceleration devices in a server cluster may implement the same hardware accelerated service. Additionally, while only one server cluster (server cluster A) is depicted as implementing the designated hardware accelerated service of type A, any number of server clusters in the server system 100 may potentially implement the designed hardware accelerated service. Thus, the data structure 412 may include a plurality of target hardware acceleration devices for each of a plurality of server clusters that all implement the designated hardware accelerated service.

Accordingly, after determining that the load data indicates that the target hardware acceleration device A1 has the lowest load in the server cluster A implementing the designated hardware accelerated service of type A, the requesting hardware acceleration device (which is example local hardware acceleration device 410 in this example), at step (4), routes the request for the designated hardware accelerated service of type A to the target hardware acceleration device A1 via the network infrastructure.

In one example, when the requesting hardware acceleration device routes the request for the designated hardware accelerated service to the target hardware acceleration device, the requesting hardware acceleration device updates load data 414 in its data structure 412 for the target hardware acceleration device based on one or more attributes of the request. Thus, in the illustrated example of FIG. 5, at step (4), when the requesting hardware acceleration device (currently 410) routes the request to the target hardware acceleration device A1, the requesting hardware acceleration device updates load data 414 in its data structure 412. For example, the requesting hardware acceleration device (currently 410) may speculatively increase the value of the load data 414 for the target hardware acceleration device A1 as the request will potentially increase its load, or may receive a message (such as an acknowledgement message) containing actual load data from the hardware acceleration device A1 as described below.

In the illustrated example, load data for the target hardware acceleration device A1 was updated from a value of "100" to a value of "200". It will be appreciated that the load data may be updated in different manners, depending on the values of the load data. In some examples, the load data includes multiple data fields storing raw values for different load attributes, such as a number of requests in queue, a size of the requests, historical time to process requests, etc. In one example, the one or more attributes of the request are selected from the group consisting of a size of the request, a type of designated hardware accelerated service, a historical time to implement the designated hardware accelerated service, historical data for the target hardware acceleration device, and packet data of the request. The size of the request may include a total packet size of the request being sent, or a total size of the data that will be processed by the designated hardware accelerated service. The type of designated hardware accelerated service may include an estimation of how much processing resources the particular designated hardware accelerated service requires to implement. A historical time to implement the designated hardware accelerated service may include past information regarding processing times for hardware acceleration devices to implement the designated hardware accelerated service on previous requests. Historical data for the target hardware acceleration device may include past information regarding a processing time for the specific target hardware acceleration device to service requests. Packet data of the request may include various packet data, such as data in a header, readable by the requesting hardware acceleration device. It will be appreciated that the above described examples of one or more attributes of the request are merely exemplary, and any other attributes of requests not specifically mentioned above may also be utilized by the requesting hardware acceleration device to speculatively update its load data with an estimation of the processing load or burden that the request will place on the receiving hardware acceleration device.

Later, if the requesting hardware acceleration device subsequently routes a new request for the designated hardware accelerated service of type A, the target hardware acceleration device A1 may no longer be the particular target hardware acceleration device 416 having the lowest load among the other target hardware acceleration devices implementing the designated hardware accelerated service of type A. In the illustrated example, load data for the target hardware acceleration device A1 was updated from a value of "100" to a value of "200", and as shown, no longer has a load value that is lower than the other target hardware acceleration devices.

Thus, the requesting hardware acceleration device (410 in this example), would route the new request to the other target hardware acceleration device A4, and then update load data in its own data structure 412 for that target hardware acceleration device. It will be appreciated that while in these examples load data being "lower" than other load data has been represented by a discrete value being smaller than another discrete value, any suitable method may be used to compare load data to determine which load data is "lower". For example, a larger value for the load data may instead indicate a lower load, and a smaller value for the load data may instead indicate a higher load. Alternatively, determining which load data is "lower" may include comparing several fields of data, such as a number of requests, a size of requests, historical time to process requests, etc.

Based on the one or more attributes of the request, the requesting hardware acceleration device (410 in this example) may accurately estimate how much additional load or processing burden the request will place on the target hardware acceleration device. However, while the requesting hardware acceleration device may determine how much additional load its own requests will add, each individual requesting hardware acceleration device may not have near-real time information about other requesting hardware acceleration devices in the hardware acceleration plane that may also be sending requests to the target hardware acceleration device.

In the illustrated example, a second requesting hardware acceleration device 420 is also routing a request for the same designated hardware accelerated service of type A at a similar time as a first requesting hardware acceleration device (410 in this example). Both the first and second requesting hardware acceleration devices maintain their own data structures 412, which may indicate that the target hardware acceleration device A1 currently has the lowest load of all of the target hardware acceleration devices implementing the designated hardware accelerated service of type A. Additionally, neither the first nor the second requesting hardware acceleration device is "aware" that the other is routing a request to the same target hardware acceleration device at the time of sending the request. After routing their own requests, the first and second requesting hardware acceleration device's both update load data in their data structure based on one or more attributes of their own requests, and are not "aware" that additional load has been placed onto the target hardware acceleration device A1 from the request of the other. Thus, the load data for the target hardware acceleration device A1 maintained separately by both the first and second requesting hardware acceleration devices may not accurately reflect how much load was actually placed onto the target hardware acceleration device A1. Accordingly, to correct estimation errors that may occur from multiple requesting hardware acceleration devices sending requests to the same receiving hardware acceleration device, each receiving hardware acceleration device is configured to send load data indicating its actual current load to other hardware acceleration devices.

In one example, when a receiving hardware acceleration device receives a request from the requesting hardware acceleration device, the receiving hardware acceleration devices responds with a message that includes load data indicating a current load of the receiving hardware acceleration device. As illustrated in FIG. 5, when the receiving hardware acceleration device (target hardware acceleration device A1 in this example) receives the request for the designated hardware accelerated service of type A from the requesting hardware acceleration device (hardware acceleration device 410 in this example) at step (4), the receiving hardware acceleration device A1 sends a message back to the requesting hardware acceleration device 410 that includes load data indicating the load of the receiving hardware acceleration device A1. It will be appreciated that the receiving hardware acceleration device A1 is "aware" of all requests that it receives, and has an accurate real time knowledge about its own load.

Thus, when the requesting hardware acceleration device 410 receives the message M1, the requesting hardware acceleration device 410 may update load data in its own data structure 412 for the target hardware acceleration device A1, which is the receiving hardware acceleration device A1. After updating its load data based on the message M1, the requesting hardware acceleration device 410 will have accurate, current, and non-speculative load data for the target hardware acceleration device A1, which reflects both the actual load placed onto the target hardware acceleration device A1 by its own request, as well as the load placed onto the target hardware acceleration device A1 by other requesting hardware acceleration devices such as the second requesting hardware acceleration device 420.

In one example, the message sent by the receiving hardware acceleration device is an acknowledgment (ACK) or a negative acknowledgement (NACK) message that is commonly sent in network protocols. The receiving hardware acceleration device may send multiple ACK and NACK messages back to the requesting hardware acceleration device as part of normal networking protocols to coordinate the sending and receiving of the request over the network, or any other types of network traffic between the requesting and receiving hardware acceleration devices. Thus, upon sending an ACK or NACK message, the receiving hardware acceleration device may opportunistically add load data to the ACK or NACK message indicating its current load. In this manner, each hardware acceleration device may piggyback on common network traffic between each other in order to opportunistically update each other on their current loads. It will be appreciated that the above example of the message of an ACK or NACK message is merely exemplary, and any network messages exchanged between the hardware acceleration devices in the hardware acceleration plane may be leveraged to send load data updates between the hardware acceleration devices.

In another example, each hardware acceleration device periodically sends load data indicating its current load to one or more other hardware acceleration devices that have previously sent requests to that hardware acceleration device. That is, each hardware acceleration device may be configured to maintain in memory a list of all of the requesting hardware acceleration devices that have previously sent a request to that hardware acceleration device, and periodically send load data updates for its own current load to each hardware acceleration device in its list. Alternatively, each hardware acceleration device may periodically send load data updates to each other hardware acceleration device that it currently has an open network connection with while exchanging packets over the network. Any suitable period may be chosen for the hardware acceleration devices to send load data updates. In one example, each hardware acceleration device may be configured to send all of the load data in its data structure containing load data for a plurality of other hardware acceleration devices.

In the above decentralized method, over time, as each hardware acceleration device periodically sends load updates to a subset of the other hardware acceleration devices in the hardware acceleration plane, every hardware acceleration device in the hardware acceleration plane may eventually receive some load data for each other hardware acceleration device in the hardware acceleration plane. Thus, through these load data updates, each hardware acceleration device may be made "aware" of all of the other hardware acceleration devices in the server system 100 and which type of hardware accelerated service each of those hardware acceleration devices implement. Thus, while the example illustrated in FIG. 5 only depicts the data structure 412 maintained by the requesting hardware acceleration device 410 as containing load data for four target hardware acceleration devices, it will be appreciated that the data structure 412 may be maintained to contain load data for all or any suitable subset of the hardware acceleration devices in the hardware acceleration plane 106.

In one example, each hardware acceleration device is configured to update a memory page accessible by an associated host server instance with load data of the data structure. For example, the example hardware acceleration device 300 illustrated in FIG. 3 may be configured to update a memory page in the local memory 316 that is accessible by local processors executing the local host server instances. By reading the memory page, the local host server instances may be made "aware" of both the load of its local hardware acceleration device, as well as the load of other remote hardware acceleration devices in the hardware acceleration plane 106. Accordingly, each host server instance in the software plane 104 may access, with low latency, load data for the hardware acceleration devices in the hardware acceleration plane 106. Thus, collective load data for the hardware acceleration plane 106 may be distributed to the software plane 104, which may be configured to leverage a current load balance state of the hardware acceleration plane 106 to change higher level service behaviors such as producing different requests, requesting additional server instances for the server system 100, etc.

Turning back to FIG. 5, the request for the designated hardware accelerated service may be generated by a host server instance of the software plane 104, or by a hardware accelerated device of the hardware acceleration plane 106. In the specific example illustrated in FIG. 5, the request for the designated hardware accelerated service originates from a requesting host server instance of the plurality of host server instances, and the requesting hardware acceleration device is coupled to the processor executing the requesting host server instance by the internal data bus, and the requesting hardware acceleration device reads the request and routes it to the target hardware acceleration device. As shown, the request for the designated hardware accelerated service of type A originated from the example local host server instance 408 which is coupled to the example local hardware acceleration device 410 via the internal data bus of the server housing both the example local hardware acceleration device 410 and the processor executing the example local host server instance 408. For example, while servicing the client request 402, the example local host server instance 408 may have determined that the client request 402 requires a hardware accelerated service implemented by the hardware acceleration plane 106, such as, for example, a web search ranking service that may be hardware accelerated. Accordingly, the example local host server instance 408 selects the web search ranking service as the designated hardware accelerated service, and sends the request for the designated hardware accelerated service to the example local hardware acceleration device 410, which subsequently reads the request and routes the request to a target hardware acceleration device.

Figure 6:
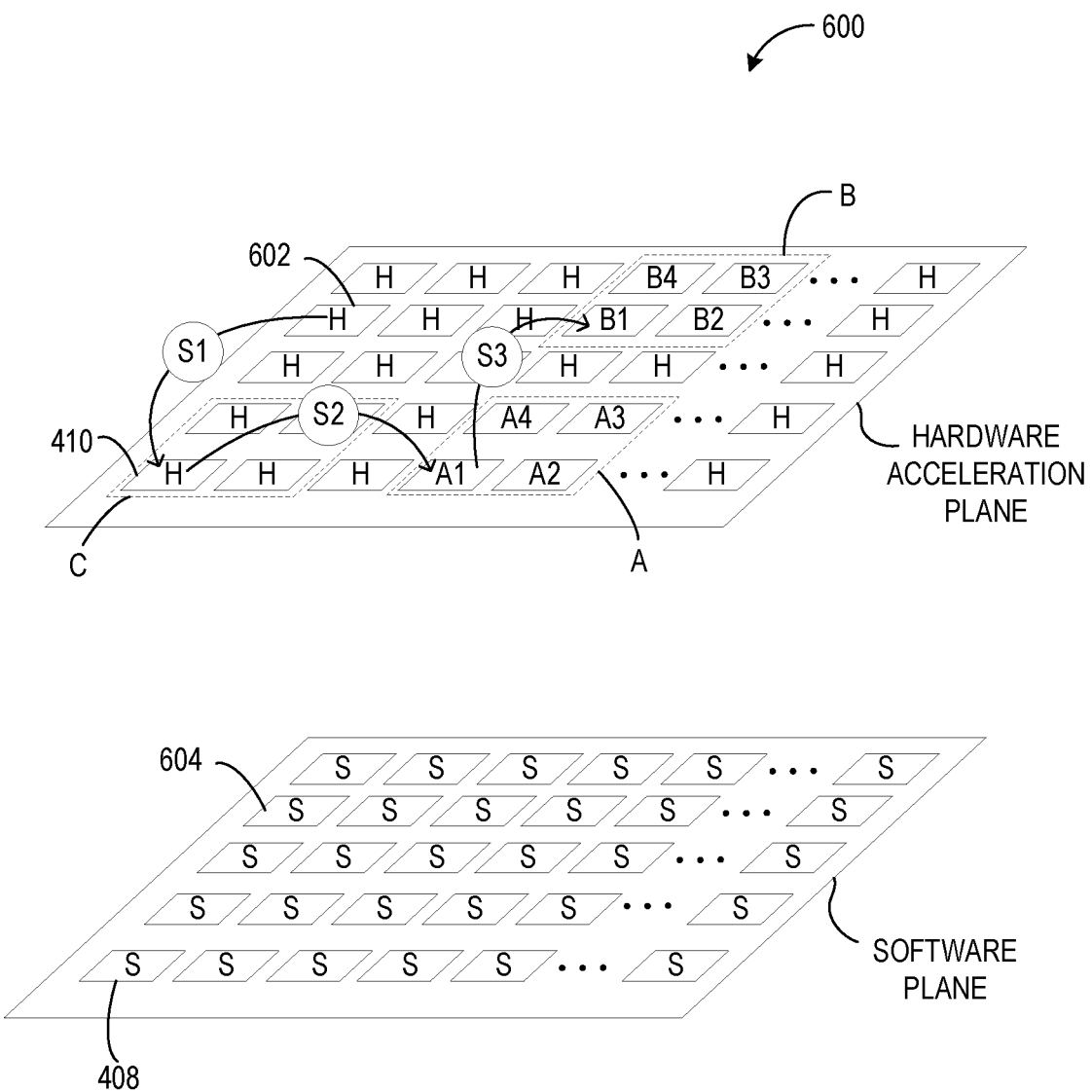
FIG. 6 is a schematic view of the server system of FIG. 1, illustrating a multi-step request.

Turning to FIG. 6, in another example, the request is a multi-step request for a plurality of designated hardware accelerated services, and the designated hardware accelerated service is a next designated hardware accelerated service of the plurality of designated hardware accelerated services. In the illustrated example, the request is a multiple-step request for three different hardware accelerated services A, B, and C of the plurality of hardware accelerated services implemented by the hardware acceleration plane. In this specific example, the three hardware accelerated services A, B, and C are completed sequentially, with each hardware acceleration device along the path of the multi-step service implement one of the three different hardware accelerated services and then routing the multi-step request to another remote hardware accelerated device that implements the next hardware accelerated service.

As illustrated, the requesting hardware acceleration device (which is hardware acceleration device 410 in this example), receives the multi-step request from another hardware acceleration device 602, implements one of the plurality of designated hardware accelerated services, and routes the multi-step request to the target hardware acceleration device implementing the next designated hardware accelerated service. As shown, the requesting hardware acceleration device 410 receives the multi-step request from another hardware acceleration device 602 in the hardware acceleration plane. Hardware acceleration device 602 may itself have received the multi-step request from yet another hardware acceleration device in the hardware acceleration plane. In another example, hardware acceleration device 602 may have generated the multi-step request itself. In yet another example, the multi-step request may have been generated by a host server instance of the software plane, such as host server instance 604 which may be local to the hardware acceleration device 602.

In these examples, the hardware acceleration device 602 routes the multi-step request to the hardware acceleration device 410, which is implementing a hardware acceleration service of type C that is one or the plurality of designated hardware accelerated services of the multi-step request. Thus, after receiving the multi-step request from another hardware acceleration device 602 at step (S1), the hardware acceleration device 410 implements the hardware acceleration service of type C on the request. The hardware acceleration device 410 further reads the multi-step request to determine that the next designated hardware accelerated service is a designated hardware accelerated service of type A. Similarly to the example of FIG. 5, the hardware acceleration device 410 maintains a data structure containing load data for a plurality of target hardware acceleration devices implementing the next designated hardware accelerated service of type A. Based on the load data of the data structure, the hardware acceleration device 410 routes the multi-step request to the target hardware acceleration device A1 at step (S2). Similarly to the hardware acceleration device 410, the target hardware acceleration device A1 receives the multi-step request from the hardware acceleration device 410, implements the designated hardware accelerated service of type A, and then at step (S3) routes the multi-step request to another target hardware acceleration device B1 that implements the last designated hardware accelerated service of type B of the multi-step request for the plurality of designed hardware accelerated services based on its maintained data structure containing load data for a second plurality of target hardware acceleration devices that implement the last designated hardware accelerated service of type B.

Turning back to FIG. 4, the request generated by the example local host server instance 408 is also a multi-step request for two designated hardware accelerated services of type A and B. The example local host server instance 408 sends the multi-step request to its local example hardware acceleration device 410 at step (3), which reads the multi-step request and routes the multi-step request to the target hardware acceleration device A1 at step (4). The multi-step request is serviced with the hardware accelerated service of type A by one of the plurality of hardware acceleration devices in the server cluster A that all implement the same hardware accelerated service of type A. At step (6), the multi-step request is routed by a hardware acceleration device in server cluster A to a second target hardware acceleration device B2 in the server cluster B that implements the last designated hardware accelerated service of type B of the multi-step request. After implementing the last designated hardware accelerated service of type B, the multi-step request has been fully serviced by the server system 100, a response 422 may be routed back to the end user's client device 404. In one example, the last hardware acceleration device to service the request, which is the second target hardware acceleration device B2 in this example, may route a response to the fully serviced request to the SLB 406, which may then route the response 422 to the client 402 request back to the client device 404.

In another example, the response to the multi-step request may be routed back through each hardware acceleration device that serviced the multi-step request until the response arrives at the example local hardware acceleration device 410, which may then send the response that resulting from the fully serviced request back to the example local host server instance 408 which had initially generated the request. The example local host server instance 408 may then process the response according to its application logic, such as, for example, by sending the response to the SLB 406 via the example local hardware acceleration device 410, the SLB 406 in turn routing the response 422 to the end user's client device 404.

In the example illustrated in FIG. 4, the example local hardware acceleration device 410 initially sent the request for the designated hardware accelerated service of type A to the target hardware acceleration device A1. As discussed previously, the target hardware acceleration device A1 was selected based on data of the data structure maintained by the requesting hardware acceleration device, which was the example local hardware acceleration device 410, the data structure including load data indicating that the target hardware acceleration device A1 was estimated to have the lowest load of a plurality of target hardware acceleration devices A1, A2, A3, and A4, that all implement that same hardware accelerated service of type A. However, as discussed in the example of FIG. 5, there may be additional other hardware acceleration devices sending requests concurrently to the requesting hardware acceleration device. Thus, by the time that the request reaches the target hardware acceleration device A1, that particular target hardware acceleration device of the plurality of target hardware acceleration devices contained in the server cluster A may no longer be the least loaded hardware acceleration device.

In another example operation, each hardware acceleration device of the two or more servers in a server cluster implement a same hardware accelerated service of the plurality of hardware accelerated services, and each hardware acceleration device in the server cluster maintains a separate instance of the data structure further containing near-real time load data indicating a near-real time load of each other hardware acceleration device in the server cluster. In this manner, the server system may load balance within a server cluster comprised of servers that offer the same hardware accelerated service via the hardware acceleration devices of its servers, in a just in time manner, so that the destination for the request may be adjusted based on current load data after the request arrives at the hardware acceleration device of a server within the cluster.

In another example operation, when a receiving hardware acceleration device in a server cluster of the plurality of server clusters receives the request from the requesting hardware acceleration device, the receiving hardware acceleration device determines whether its current load is higher than a threshold load value and/or higher than another hardware acceleration device in the server cluster implementing the same hardware accelerated service based on near-real time load data of the data structure, and based on at least the determination, the receiving hardware acceleration device redirects the request to another hardware acceleration device in the server cluster which near-real time load data of the data structure indicates has a lower load than other hardware acceleration devices in the server cluster. In this manner, the hardware acceleration device can first check whether it has the available capacity to service the request by examining whether its own load is below the threshold load value, and if so it may process the request. If the load is above the threshold, then the hardware acceleration device proceeds to route the request to a hardware acceleration device with lower load. In another configuration, the hardware acceleration device can always route the incoming request to another hardware acceleration device with an indicated lower load, without querying whether a present load is above the load threshold. By near real time data, it is meant the latest load data that the hardware acceleration device has received for its peer hardware acceleration devices in the same cluster. It will be appreciated that due to the high speed of communication within the cluster via the backplane of the rack and via the TOR network switch, load data for devices in the same cluster can be updated extremely quickly, and will be as near to real time as possible.

Figure 7:
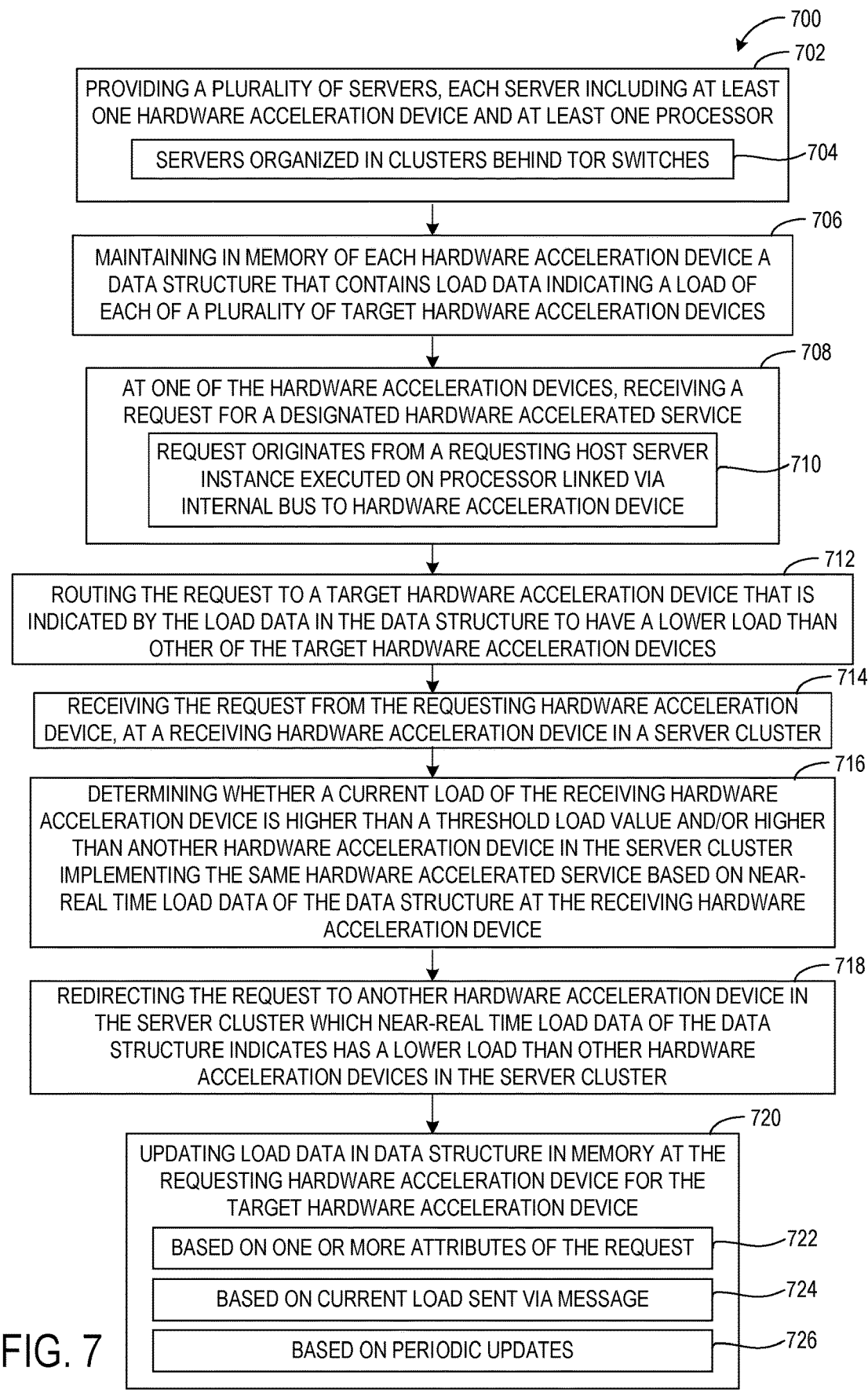
FIG. 7 is a flow chart of an example method for hardware based load balancing, which may be implemented using this server system of FIG. 1 or other suitable server system hardware.

Turning now to FIG. 7, a method 700 implemented by a server system for hardware implemented load balancing will be described. Method 700 may be implemented using the hardware of the server system 100 described above, or other suitable hardware. At 702, the method may include providing a plurality of servers, each server including at least one hardware acceleration device and at least one processor communicatively coupled to the hardware acceleration device by an internal data bus and executing a host server instance. The host server instances of the plurality of servers collectively provide a software plane, and the hardware acceleration devices of the plurality of servers collectively provide a hardware acceleration plane that implements a plurality of hardware accelerated services.

As shown at 704, the plurality of servers may be provided in a plurality of server clusters, each server cluster including a top of rack network switch, two or more servers of the plurality of servers, and a backplane communicatively coupling the top of rack network switch and the two or more servers.

At 706, the method may include, at each hardware acceleration device, maintaining in memory a data structure that contains load data indicating a load of each of a plurality of target hardware acceleration devices implementing a designated hardware accelerated service of the plurality of hardware accelerated services.

At 708, the method may include receiving a request for a designated hardware accelerated service at one of the hardware acceleration devices.

As shown at 710, the request for the designated hardware accelerated service may originate from a requesting host server instance of the plurality of host server instances. In this case, the requesting hardware acceleration device may be coupled to the processor executing the requesting host server instance by the internal data bus.

At 712, the method may include routing the request to a target hardware acceleration device that is indicated by the load data in the data structure to have a lower load than other of the target hardware acceleration devices. In a case such as at 710 where the request originates at a server instance, the requesting hardware acceleration device may read the request and route it to the target hardware acceleration device to perform step 712.

Figure 8:
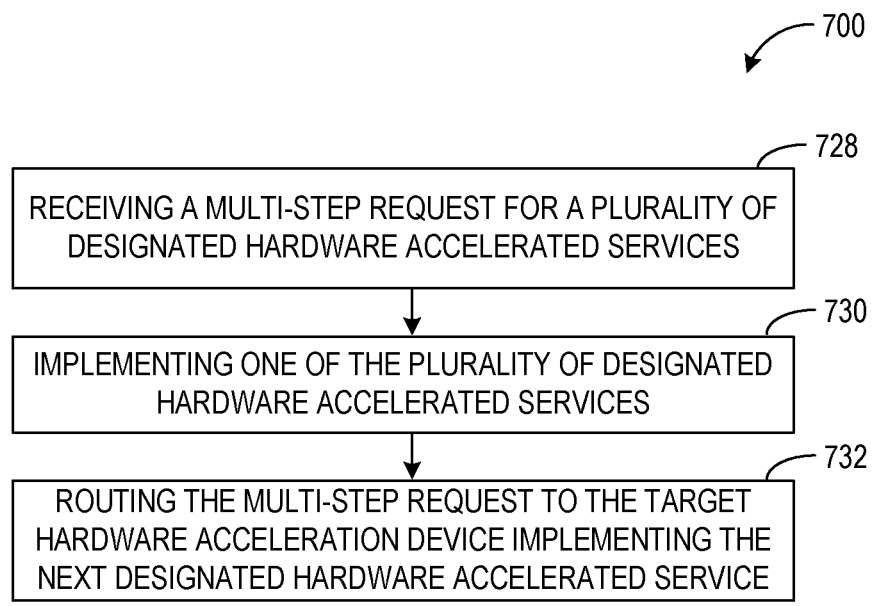
FIG. 8 is another flow chart showing additional steps of the method of FIG. 7.

As shown in FIG. 8, the request of step 708 of method 700 may be formulated as a multi-step request for a plurality of designated hardware accelerated services, and the designated hardware accelerated service may be a next designated hardware accelerated service of the plurality of designated hardware accelerated services. In such a case, as shown at 728, the method may include, at the one of the hardware acceleration devices, receiving the multi-step request from another hardware acceleration device, as shown at 730 the method may include implementing one of the plurality of designated hardware accelerated services, and as shown at 732 the method may include routing the multi-step request to the target hardware acceleration device implementing the next designated hardware accelerated service.

Returning to FIG. 7, in an example configuration, the method may further include, in a case where the servers are organized into clusters as shown at 704, each hardware acceleration device of the two or more servers in a server cluster implementing a same hardware accelerated service of the plurality of hardware accelerated services, and maintaining respective instances of the data structure further containing near-real time load data indicating a near-real time load of each other hardware acceleration device in the server cluster.

The method 700 may further include, at 714, receiving the request from the requesting hardware acceleration device, at a receiving hardware acceleration device in a server cluster of the plurality of server clusters. At 716, the method may include determining whether a current load of the receiving hardware acceleration device is higher than a threshold load value and/or higher than another hardware acceleration device in the server cluster implementing the same hardware accelerated service based on near-real time load data of the data structure at the receiving hardware acceleration device. At 718, the method may include, based on at least the determination, redirecting the request to another hardware acceleration device in the server cluster which near-real time load data of the data structure indicates has a lower load than other hardware acceleration devices in the server cluster.

At 720, the method may include, when the requesting hardware acceleration device routes the request for the designated hardware accelerated service to the target hardware acceleration device, the requesting hardware acceleration device updating load data in its data structure for the target hardware acceleration device. As shown at 722, this updating may be based on one or more attributes of the request. These attributes may include a size of the request, a type of designated hardware accelerated service, a historical time to implement the designated hardware accelerated service, historical data for the target hardware acceleration device, and packet data of the request.

As indicated at 724, the updating may be based on a current load of the hardware acceleration device, sent via a message. For example, when a receiving hardware acceleration device receives a request from the requesting hardware acceleration device, the receiving hardware acceleration devices may respond with a message that includes load data indicating a current load of the receiving hardware acceleration device, and the requesting hardware acceleration device may update load data in the data structure stored in memory at the receiving hardware acceleration device based upon the current load indicated in the message from the receiving hardware acceleration device.

As indicated at 726, the updating may be based on periodic load updates sent from the hardware acceleration devices to each other. For example, each hardware acceleration device may periodically send load data indicating its current load to one or more other hardware acceleration devices that have previously sent requests to that hardware acceleration device.

The above described systems and methods may be used to achieve just in time routing of requests from one hardware acceleration device to another, based on load data stored in data structures in memory associated with each hardware acceleration device. Since the load data is continually updated, intelligent routing decisions can be made at the time the request is sent, and even after the request is received at the originally intended target device, which enable the request to be eventually routed to a hardware acceleration device that has a lower load than other candidate hardware acceleration devices. This in turn has the potential to service request faster and more efficiently, increasing the speed with which the server system may respond to requests.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
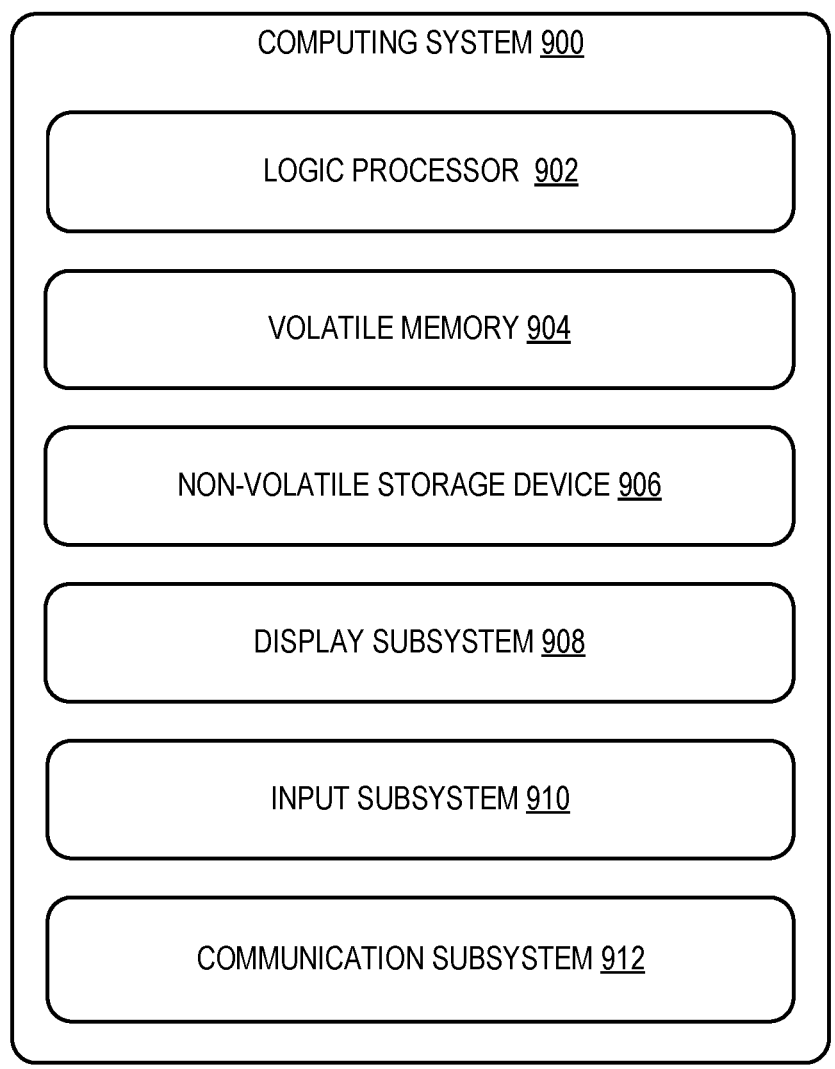
FIG. 9 is a schematic view of exemplary computer hardware that may be used in the server system of FIG. 1.

FIG. 9 schematically shows a non-limiting embodiment of a computing system 900 that can enact one or more of the methods and processes described above. Computing system 900 is shown in simplified form. Computing system 900 may embody the individual servers 102, 206, 208, 210, etc., and client device 404 described above. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 906 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a server system comprising a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services, wherein each hardware acceleration device maintains in memory a data structure that contains load data indicating a load of each of a plurality of target hardware acceleration devices implementing a designated hardware accelerated service of the plurality of hardware accelerated services, and wherein, when a requesting hardware acceleration device routes a request for the designated hardware accelerated service, the requesting hardware acceleration device routes the request to a target hardware acceleration device that is indicated by the load data in the data structure to have a lower load than other of the target hardware acceleration devices. In this aspect, additionally or alternatively, the request for the designated hardware accelerated service may originate from a requesting host server instance of the plurality of host server instances, wherein the requesting hardware acceleration device may be coupled to the processor executing the requesting host server instance by the internal data bus, and the requesting hardware acceleration device may read the request and may route it to the target hardware acceleration device. In this aspect, additionally or alternatively, the request may be a multi-step request for a plurality of designated hardware accelerated services, and the designated hardware accelerated service may be a next designated hardware accelerated service of the plurality of designated hardware accelerated services, and wherein the requesting hardware acceleration device may receive the multi-step request from another hardware acceleration device, may implement one of the plurality of designated hardware accelerated services, and may route the multi-step request to the target hardware acceleration device implementing the next designated hardware accelerated service. In this aspect, additionally or alternatively, the server system may further comprise a plurality of server clusters, wherein each server cluster may include a top of rack network switch, two or more servers of the plurality of servers, and a backplane communicatively coupling the top of rack network switch and the two or more servers, wherein each hardware acceleration device of the two or more servers in a server cluster may implement a same hardware accelerated service of the plurality of hardware accelerated services, and each may maintain a respective instance of the data structure further containing near-real time load data indicating a near-real time load of each other hardware acceleration device in the server cluster. In this aspect, additionally or alternatively, when a receiving hardware acceleration device in a server cluster of the plurality of server clusters receives the request from the requesting hardware acceleration device, the receiving hardware acceleration device may determine whether its current load is higher than a threshold load value and/or higher than another hardware acceleration device in the server cluster implementing the same hardware accelerated service based on near-real time load data of the data structure, and based on at least the determination, the receiving hardware acceleration device may redirect the request to another hardware acceleration device in the server cluster which near-real time load data of the data structure indicates has a lower load than other hardware acceleration devices in the server cluster. In this aspect, additionally or alternatively, when the requesting hardware acceleration device routes the request for the designated hardware accelerated service to the target hardware acceleration device, the requesting hardware acceleration device may update load data in its data structure for the target hardware acceleration device based on one or more attributes of the request. In this aspect, additionally or alternatively, the one or more attributes of the request may be selected from the group consisting of a size of the request, a type of designated hardware accelerated service, a historical time to implement the designated hardware accelerated service, historical data for the target hardware acceleration device, and packet data of the request. In this aspect, additionally or alternatively, when a receiving hardware acceleration device receives a request from the requesting hardware acceleration device, the receiving hardware acceleration devices may respond with a message that includes load data indicating a current load of the receiving hardware acceleration device. In this aspect, additionally or alternatively, each hardware acceleration device may periodically send load data indicating its current load to one or more other hardware acceleration devices that have previously sent requests to that hardware acceleration device. In this aspect, additionally or alternatively, each hardware acceleration device may be configured to update a memory page accessible by an associated host server instance with load data of the data structure.

Another aspect provides a method implemented by a server system, the method comprising providing a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services, at each hardware acceleration device maintaining in memory a data structure that contains load data indicating a load of each of a plurality of target hardware acceleration devices implementing a designated hardware accelerated service of the plurality of hardware accelerated services, and at one of the hardware acceleration devices receiving a request for a designated hardware accelerated service, and routing the request to a target hardware acceleration device that is indicated by the load data in the data structure to have a lower load than other of the target hardware acceleration devices. In this aspect, additionally or alternatively, the request for the designated hardware accelerated service may originate from a requesting host server instance of the plurality of host server instances, and wherein the requesting hardware acceleration device may be coupled to the processor executing the requesting host server instance by the internal data bus, and the requesting hardware acceleration device may read the request and may route it to the target hardware acceleration device. In this aspect, additionally or alternatively, the request may be a multi-step request for a plurality of designated hardware accelerated services, and the designated hardware accelerated service may be a next designated hardware accelerated service of the plurality of designated hardware accelerated services, the method may further comprise, at the one of the hardware acceleration devices, receiving the multi-step request from another hardware acceleration device, implementing one of the plurality of designated hardware accelerated services, and routing the multi-step request to the target hardware acceleration device implementing the next designated hardware accelerated service. In this aspect, additionally or alternatively, providing a plurality of servers may include providing a plurality of server clusters, each server cluster may include a top of rack network switch, two or more servers of the plurality of servers, and a backplane communicatively coupling the top of rack network switch and the two or more servers, wherein each hardware acceleration device of the two or more servers in a server cluster may implement a same hardware accelerated service of the plurality of hardware accelerated services, and may maintain the data structure further containing near-real time load data indicating a near-real time load of each other hardware acceleration device in the server cluster. In this aspect, additionally or alternatively, the method may include receiving the request from the requesting hardware acceleration device, at a receiving hardware acceleration device in a server cluster of the plurality of server clusters, determining whether a current load of the receiving hardware acceleration device is higher than a threshold load value and/or higher than another hardware acceleration device in the server cluster implementing the same hardware accelerated service based on near-real time load data of the data structure at the receiving hardware acceleration device, and based on at least the determination, redirecting the request to another hardware acceleration device in the server cluster which near-real time load data of the data structure indicates has a lower load than other hardware acceleration devices in the server cluster. In this aspect, additionally or alternatively, when the requesting hardware acceleration device routes the request for the designated hardware accelerated service to the target hardware acceleration device, the requesting hardware acceleration device may update load data in its data structure for the target hardware acceleration device based on one or more attributes of the request. In this aspect, additionally or alternatively, the one or more attributes of the request may be selected from the group consisting of a size of the request, a type of designated hardware accelerated service, a historical time to implement the designated hardware accelerated service, historical data for the target hardware acceleration device, and packet data of the request. In this aspect, additionally or alternatively, when a receiving hardware acceleration device receives a request from the requesting hardware acceleration device, the receiving hardware acceleration devices may respond with a message that includes load data indicating a current load of the receiving hardware acceleration device, and the requesting hardware acceleration device may update load data in the data structure stored in memory at the receiving hardware acceleration device based upon the current load indicated in the message from the receiving hardware acceleration device. In this aspect, additionally or alternatively, each hardware acceleration device may periodically send load data indicating its current load to one or more other hardware acceleration devices that have previously sent requests to that hardware acceleration device.

Another aspect provides a server system comprising a plurality of server clusters of a plurality of servers, each server cluster including a top of rack network switch and two or more of the plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services, wherein each hardware acceleration device in a server cluster of the plurality of server clusters implement a same hardware accelerated service of the plurality of hardware accelerated services, wherein each hardware acceleration device maintains in memory a data structure that contains near-real time load data indicating a near-real time load of each other hardware acceleration device in a same server cluster as that hardware acceleration device, and wherein when a receiving hardware acceleration device in a server cluster of the plurality of server clusters receives a request from a requesting hardware acceleration device, the receiving hardware acceleration device determines whether its current load is higher than a threshold load value and/or higher than another hardware acceleration device in the server cluster implementing the same hardware accelerated service based on near-real time load data of the data structure, and based on at least the determination, the receiving hardware acceleration device redirects the request to another hardware acceleration device in the server cluster which near-real time load data of the data structure indicates has a lower load than other hardware acceleration devices in the server cluster.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server system comprising:
  a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services;
  wherein each hardware acceleration device collects load data from other hardware acceleration devices of other servers and maintains in memory of a respective server of that hardware acceleration device a data structure that contains the load data indicating a load of each of a plurality of target hardware acceleration devices implementing a designated hardware accelerated service of the plurality of hardware accelerated services; and
  wherein, when a requesting hardware acceleration device routes a request for the designated hardware accelerated service, the requesting hardware acceleration device routes the request to a target hardware acceleration device that is indicated by the load data in the data structure of a respective server of the requesting hardware acceleration device to have a lower load than other of the target hardware acceleration devices.

2. The server system of claim 1, wherein the request for the designated hardware accelerated service originates from a requesting host server instance of the plurality of host server instances; and
  wherein the requesting hardware acceleration device is coupled to the processor executing the requesting host server instance by the internal data bus, and the requesting hardware acceleration device reads the request and routes it to the target hardware acceleration device.

3. The server system of claim 1, wherein the request is a multi-step request for a plurality of designated hardware accelerated services, and the designated hardware accelerated service is a next designated hardware accelerated service of the plurality of designated hardware accelerated services; and
  wherein the requesting hardware acceleration device receives the multi-step request from another hardware acceleration device, implements one of the plurality of designated hardware accelerated services, and routes the multi-step request to the target hardware acceleration device implementing the next designated hardware accelerated service.

4. The server system of claim 1, further comprising a plurality of server clusters, each server cluster including a top of rack network switch, two or more servers of the plurality of servers, and a backplane communicatively coupling the top of rack network switch and the two or more servers;
  wherein each hardware acceleration device of the two or more servers in a server cluster implement a same hardware accelerated service of the plurality of hardware accelerated services, and each maintains a respective instance of the data structure further containing near-real time load data indicating a near-real time load of each other hardware acceleration device in the server cluster.

5. The server system of claim 4, wherein when a receiving hardware acceleration device in a server cluster of the plurality of server clusters receives the request from the requesting hardware acceleration device, the receiving hardware acceleration device determines whether the receiving hardware acceleration device's current load is higher than at least one of a threshold load value or a current load of another hardware acceleration device in the server cluster implementing the same hardware accelerated service based on near-real time load data of the data structure, and
  based on at least the determination, the receiving hardware acceleration device redirects the request to another hardware acceleration device in the server cluster which near-real time load data of the data structure indicates has a lower load than other hardware acceleration devices in the server cluster.

6. The server system of claim 1, wherein when the requesting hardware acceleration device routes the request for the designated hardware accelerated service to the target hardware acceleration device, the requesting hardware acceleration device updates load data in the requesting hardware acceleration device's data structure for the target hardware acceleration device based on one or more attributes of the request.

7. The server system of claim 6, wherein the one or more attributes of the request are selected from the group consisting of a size of the request, a type of designated hardware accelerated service, a historical time to implement the designated hardware accelerated service, historical data for the target hardware acceleration device, and packet data of the request.

8. The server system of claim 1, wherein, when a receiving hardware acceleration device receives a request from the requesting hardware acceleration device, the receiving hardware acceleration devices responds with a message that includes load data indicating a current load of the receiving hardware acceleration device.

9. The server system of claim 1, wherein each hardware acceleration device periodically sends load data indicating that hardware acceleration device's current load to one or more other hardware acceleration devices that have previously sent requests to that hardware acceleration device.

10. The server system of claim 1, wherein each hardware acceleration device is configured to update a memory page accessible by an associated host server instance with load data of the data structure.

11. A method implemented by a server system, the method comprising:
providing a plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services;
at each hardware acceleration device:
collecting load data from other hardware acceleration devices of other servers and maintaining in memory of a respective server of that hardware acceleration device a data structure that contains the load data indicating a load of each of a plurality of target hardware acceleration devices implementing a designated hardware accelerated service of the plurality of hardware accelerated services; and
at one of the hardware acceleration devices:
receiving a request for a designated hardware accelerated service; and
routing the request to a target hardware acceleration device that is indicated by the load data in the data structure of a respective server of the at least one of the hardware acceleration devices to have a lower load than other of the target hardware acceleration devices.

12. The method of claim 11, wherein the request for the designated hardware accelerated service originates from a requesting host server instance of the plurality of host server instances; and
wherein the requesting hardware acceleration device is coupled to the processor executing the requesting host server instance by the internal data bus, and the requesting hardware acceleration device reads the request and routes it to the target hardware acceleration device.

13. The method of claim 11, wherein the request is a multi-step request for a plurality of designated hardware accelerated services, and the designated hardware accelerated service is a next designated hardware accelerated service of the plurality of designated hardware accelerated services, the method further comprising:
at the one of the hardware acceleration devices:
receiving the multi-step request from another hardware acceleration device;
implementing one of the plurality of designated hardware accelerated services; and
routing the multi-step request to the target hardware acceleration device implementing the next designated hardware accelerated service.

14. The method of claim 11,
wherein providing a plurality of servers includes providing a plurality of server clusters, each server cluster including a top of rack network switch, two or more servers of the plurality of servers, and a backplane communicatively coupling the top of rack network switch and the two or more servers;
wherein each hardware acceleration device of the two or more servers in a server cluster implements a same hardware accelerated service of the plurality of hardware accelerated services, and maintains the data structure further containing near-real time load data indicating a near-real time load of each other hardware acceleration device in the server cluster.

15. The method of claim 14,
receiving the request from the requesting hardware acceleration device, at a receiving hardware acceleration device in a server cluster of the plurality of server clusters;
determining whether a current load of the receiving hardware acceleration device is higher than at least one of a threshold load value or a current load of another hardware acceleration device in the server cluster implementing the same hardware accelerated service based on near-real time load data of the data structure at the receiving hardware acceleration device; and
based on at least the determination, redirecting the request to another hardware acceleration device in the server cluster which near-real time load data of the data structure indicates has a lower load than other hardware acceleration devices in the server cluster.

16. The method of claim 11, wherein when the requesting hardware acceleration device routes the request for the designated hardware accelerated service to the target hardware acceleration device, the requesting hardware acceleration device updates load data in the requesting hardware acceleration device's data structure for the target hardware acceleration device based on one or more attributes of the request.

17. The method of claim 16, wherein the one or more attributes of the request are selected from the group consisting of a size of the request, a type of designated hardware accelerated service, a historical time to implement the designated hardware accelerated service, historical data for the target hardware acceleration device, and packet data of the request.

18. The method of claim 11, wherein, when a receiving hardware acceleration device receives a request from the requesting hardware acceleration device, the receiving hardware acceleration devices responds with a message that includes load data indicating a current load of the receiving hardware acceleration device, and the requesting hardware acceleration device updates load data in the data structure stored in memory at the receiving hardware acceleration device based upon the current load indicated in the message from the receiving hardware acceleration device.

19. The method of claim 11, wherein each hardware acceleration device periodically sends load data indicating that hardware acceleration device's current load to one or more other hardware acceleration devices that have previously sent requests to that hardware acceleration device.

20. A server system comprising:
a plurality of server clusters of a plurality of servers, each server cluster including a top of rack network switch and two or more of the plurality of servers, each server including at least one hardware acceleration device and at least one processor communicatively coupled to the hardware acceleration device by an internal data bus and executing a host server instance, the host server instances of the plurality of servers collectively providing a software plane, and the hardware acceleration devices of the plurality of servers collectively providing a hardware acceleration plane that implements a plurality of hardware accelerated services;
wherein each hardware acceleration device in a server cluster of the plurality of server clusters implement a same hardware accelerated service of the plurality of hardware accelerated services;
wherein each hardware acceleration device maintains in memory a data structure that contains near-real time load data indicating a near-real time load of each other hardware acceleration device in a same server cluster as that hardware acceleration device; and
wherein when a receiving hardware acceleration device in a server cluster of the plurality of server clusters receives a request from a requesting hardware acceleration device, the receiving hardware acceleration device determines whether the receiving hardware acceleration device's current load is higher than a threshold load value and/or higher than another hardware acceleration device in the server cluster implementing the same hardware accelerated service based on near-real time load data of the data structure, and
based on at least the determination, the receiving hardware acceleration device redirects the request to another hardware acceleration device in the server cluster which near-real time load data of the data structure indicates has a lower load than other hardware acceleration devices in the server cluster.

* * * * *